United States Patent [19]

Vickers

[11] 4,430,300
[45] * Feb. 7, 1984

[54] FLUID CATALYST REGENERATION APPARATUS

[75] Inventor: Anthony G. Vickers, Arlington Heights, Ill.

[73] Assignee: UOP Inc., Des Plaines, Ill.

[*] Notice: The portion of the term of this patent subsequent to Jan. 6, 1998 has been disclaimed.

[21] Appl. No.: 421,696

[22] Filed: Sep. 22, 1982

Related U.S. Application Data

[60] Division of Ser. No. 303,256, Sep. 17, 1981, Pat. No. 4,371,501, which is a division of Ser. No. 118,372, Feb. 4, 1980, Pat. No. 4,309,308, which is a continuation-in-part of Ser. No. 969,607, Dec. 14, 1978, Pat. No. 4,219,442.

[51] Int. Cl.³ .................. B01J 21/20; B01J 29/38; B01J 8/26; C10G 11/18
[52] U.S. Cl. .................. 422/109; 165/104.16; 208/164; 208/DIG. 1; 422/105; 422/110; 422/111; 422/144; 422/146; 502/41
[58] Field of Search ............ 208/DIG. 1, 164; 422/144, 109, 105, 106, 110, 111, 146; 252/417, 419

[56] References Cited

U.S. PATENT DOCUMENTS

| | | | |
|---|---|---|---|
| 2,439,811 | 4/1948 | Jewell | 422/223 X |
| 2,819,951 | 1/1958 | Medlin et al. | 252/417 |
| 2,883,335 | 4/1959 | Smith | 422/144 X |
| 2,970,117 | 1/1961 | Harper | 252/417 |
| 3,351,548 | 11/1967 | Payne et al. | 252/417 |
| 3,378,483 | 4/1968 | Worrell et al. | 422/144 X |
| 3,847,793 | 11/1974 | Schwartz et al. | 252/417 X |
| 3,898,050 | 8/1975 | Strother | 208/164 X |
| 3,990,992 | 11/1976 | McKinney | 252/417 |
| 4,065,269 | 12/1977 | Pulak | 252/417 X |
| 4,160,743 | 7/1979 | Kelley | 252/417 X |
| 4,167,492 | 9/1979 | Varady | 252/417 |
| 4,197,189 | 4/1980 | Thompson et al. | 208/164 |
| 4,211,637 | 7/1980 | Gross et al. | 208/164 |
| 4,220,622 | 9/1980 | Kelley | 422/109 |
| 4,243,634 | 1/1981 | Vickers | 422/145 X |

FOREIGN PATENT DOCUMENTS

| | | | |
|---|---|---|---|
| 2526839 | 1/1976 | Fed. Rep. of Germany | 252/417 |
| 1495843 | 12/1977 | United Kingdom | 252/417 |

*Primary Examiner*—Barry S. Richman
*Attorney, Agent, or Firm*—James R. Hoatson, Jr.; Louis A. Morris; William H. Page, II

[57] ABSTRACT

An apparatus for regenerating coke-contaminated fluid catalyst is disclosed which comprises a vertical combustion chamber, an inlet to said chamber for spent catalyst and regeneration gas, a heat removal chamber located superadjacent to the combustion chamber and in communication therewith, heat removal means disposed within the heat removal chamber, a catalyst withdrawal conduit connected at one end to the heat removal chamber for withdrawing regenerated fluid catalyst from the heat removal chamber, and a catalyst recycle conduit connecting the withdrawal conduit with the lower portion of the combustion chamber, such that regenerated fluid catalyst can pass from the heat removal chamber to the combustion chamber. There may also be a means and control system for manipulating the extent of immersion of the heat removal means. A control system senses the catalyst temperature at an upper locus of the combustion chamber, formulates an output signal via a temperature control means having an adjustable set point, and regulates the flow rate of regenerated catalyst through the catalyst withdrawal conduit via transmission of said output signal to a flow control means responsive thereto.

2 Claims, 3 Drawing Figures

FLUID CATALYST REGENERATION APPARATUS

CROSS-REFERENCE TO RELATED APPLICATIONS

This is a division of prior copending application Ser. No. 303,256 filed Sept. 17, 1981 and issued as U.S. Pat. No. 4,371,501 on Feb. 1, 1983, which is a division of prior copending application Ser. No. 118,372 filed Feb. 4, 1980, issued as U.S. Pat. No. 4,309,308 on Jan. 5, 1982, which is a continuation-in-part of prior, copending application Ser. No. 969,607 filed Dec. 14, 1978 and issued as U.S. Pat. No. 4,219,442 on Aug. 26, 1980.

BACKGROUND OF THE INVENTION

The field of art to which this invention pertains is fluid catalyst regeneration. It relates to the rejuvenation of particulated-solid, fluidizable catalyst which has been contaminated by the deposition thereupon of coke. The present invention will be most useful in a process for regenerating coke-contaminated fluid cracking catalyst, but it should find use in any process in which coke is burned from a solid, particulated fluidizable catalyst.

DESCRIPTION OF THE PRIOR ART

The fluid catalytic cracking process (hereinafter FCC) has been extensively relied upon for the conversion of starting materials, such as vacuum gas oils, and other relatively heavy oils, into lighter and more valuable products. FCC involves the contact in a reaction zone of the starting material, whether it be vacuum gas oil or another oil, with a finely divided, or particulated, solid, catalytic material which behaves as a fluid when mixed with a gas or vapor. This material possesses the ability to catalyze the cracking reaction, and in so acting it is surface-deposited with coke, a by-product of the cracking reaction. Coke is comprised of hydrogen, carbon and other material such as sulfur, and it interferes with the catalytic activity of FCC catalysts. Facilities for the removal of coke from FCC catalyst, so-called regeneration facilities or regenerators, are ordinarily provided within an FCC unit. Regenerators contact the coke-contaminated catalyst with an oxygen-containing gas at conditions such that the coke is oxidized and a considerable amount of heat is released. A portion of this heat escapes the regenerator with flue gas, comprised of excess regeneration gas and the gaseous products of coke oxidation, and the balance of the heat leaves the regenerator with the regenerated, or relatively coke-free, catalyst. Regenerators operating at superatmospheric pressures are often fitted with energy-recovery turbines which expand the flue gas as its escapes from the regenerator and recover a portion of the energy liberated in the expansion.

The fluidized catalyst is continuously circulated from the reaction zone to the regeneration zone and then again to the reaction zone. The fluid catalyst, as well as providing catalytic action, acts as a vehicle for the transfer of heat from zone to zone. Catalyst exiting the reaction zone is spoken of as being "spent", that is partially deactivated by the deposition of coke upon the catalyst. Catalyst from which coke has been substantially removed is spoken of as "regenerated catalyst".

The rate of conversion of the feed stock within the reaction zone is controlled by regulation of the temperature, activity of catalyst and quantity of catalyst (i.e. catalyst to oil ratio) therein. The most common method of regulating the temperature is by regulating the rate of circulation of catalyst from the regeneration zone to the reaction zone which simultaneously increases the catalyst/oil ratio. That is to say, if it is desired to increase the conversion rate an increase in the rate of flow of circulating fluid catalyst from the regenerator to the reactor is effected. Inasmuch as the temperature within the regeneration zone under normal operations is invariably higher than the temperature within the reaction zone, this increase in influx of catalyst from the hotter regeneration zone to the cooler reaction zone effects an increase in reaction zone temperature. It is interesting to note that: this higher catalyst circulation rate is sustainable by virtue of the system being a closed circuit; and, the higher reactor temperature is sustainable by virtue of the fact that increased reactor temperatures, once effected, produce an increase in the amount of coke being formed in the reaction and deposited upon the catalyst. This increased prduction of coke, which coke is deposited upon the fluid catalyst within the reactor, provides, upon its oxidation within the regenerator, an increased evolution of heat. It is this increased heat evolved within the regeneration zone which, when conducted with the catalyst to the reaction zone, sustains the higher reactor temperature operation.

Recent, politico-economic restraints which have been put upon the traditional lines of supply of crude oil have made necessary the use, as starting materials in FCC units, of heavier-than-normal oils. FCC units must not cope with feed stocks such as residual oils and in the future may require the use of mixtures of heavy oils with coal or shale derived feeds.

The chemical nature and molecular structure of the feed to the FCC unit will affect that level of coke on spent catalyst. Generally speaking, the higher the molecular weight, the higher the Conradson carbon, the higher the heptane insolubles, and the higher the carbon to hydrogen ratio, the higher will be the coke level on the spent catalyst. Also high levels of combined nitrogen, such as is found in shale derived oils, will also increase the coke level on spent catalyst. The processing of heavier feedstocks, and particularly the processing of deasphalted oils, or direct processing of atmospheric bottoms from a crude unit, commonly referred to as reduced crude, does cause an increase in all or some of these factors and does therefore cause an increase in coke level on spent catalyst.

This increase in coke on spent catalyst results in a larger amount of coke burnt in the regenerator per pound of catalyst circulated. Heat is removed from the regenerator in conventional FCC units in the flue gas and principally in the hot regenerated catalyst stream. An increase in the level of coke on spent catalyst will increase the temperature difference between the reactor and the regenerator, and in the regenerated catalyst temperature. A reduction in the amount of catalyst circulated is therefore necessary in order to maintain the same reactor temperature. However, this lower catalyst circulation rate required by the higher temperature difference between the reactor and the regenerator will result in a fall in conversion, making it necessary to operate with a higher reactor temperature in order to maintain conversion at the desired level. This will cause a change in yield structure which may or may not be desirable, depending on what products are required from the process. Also there are limitations to the temperatures that can be tolerated by FCC catalyst without there being a substantial detrimental effect on catalyst activity. Generally, with commonly available modern FCC catalyst, temperatures of regenerated catalyst are usually maintained below 1350° F., since loss of activity would be very severe above 1400°–1450° F. Also, energy recovery turbines, sometimes called "power recovery turbines", commonly cannot tolerate flue gas at temperatures in excess of 1300°–1350° F. If a relatively common reduced crude such as that derived from Light Arabian crude oil were charged to a conventional FCC unit, and operated at a temperature required for high conversion to lighter products, i.e. similar to that for a gas oil charge, the regenerator temperature would operate in the range of 1600°–1800° F. This would be too high a temperature for the catalyst, require very expensive materials of construction, and give an extremely low catalyst circulation rate. It is therefore accepted that when materials are processed that would give excessive regenerator temperatures, a means must be provided for removing heat from the regenerator, which enables a lower regenerator temperature, and a lower temperature difference between the reactor and the regenerator.

Prior art methods of heat removal generally provide coolant-filled coils within the regenerator, which coils are in contact either with the catalyst from which coke is being removed or with the flue gas just prior to the flue gas' exit from the regenerator. For example, McKinney U.S. Pat. No. 3,990,992 discloses a fluid catalytic cracking process dual zone regenerator with cooling coils mounted in the second zone. The second zone is for catalyst disengagement prior to passing the flue gas from the system, and contains catalyst in a dilute phase. Coolant flowing through the coils absorbs heat and removes it from the regenerator.

These prior art coils have been found to be inflexible in that they are usually sized to remove the quantity of heat which will be liberated by the prospective feed stock which is most extensively coke-forming. Difficulties arise when a feed stock of lesser coke-forming characteristics is processed. In such a case the heatremoval coils are now oversized for the job at hand. They, consequently, remove entirely too much heat. When heat removal from the regenerator is higher than that required for a particular operation, the temperature within the regenerator is depressed. This leads to a lower than desired temperature of regenerated catalyst exiting the regenerator. The catalyst circulation rate required to obtain the desired reaction zone temperature will increase, and may exceed the mechanical limitations of the equipment. The coke production rate will be higher than necessary on this feedstock, and the lower temperature will result in less efficient coke burning in the regeneration zone, with a greater amount of residual coke on regenerated catalyst. Such are the operational difficulties caused by prior art heat removal means due to their inflexibility.

Indeed, these prior art heat removal schemes also significantly complicate the start-up of prior art units. The presence of inflexible heat removal coils within the coke-oxidizing section of the regenerator often drastically extends the time period required for raising the regenerator to its operational temperature level.

Like the basic concept of heat removal from FCC regenerators, the basic concept of internal and external recycle of catalyst particles in FCC regenerators is not, per se, novel. Examples of such concepts are taught in Gross et al U.S. Pat. No. 4,035,284, Pulak U.S. Pat. No. 3,953,175, Strother U.S. Pat. No. 3,898,050, Conner et al U.S. Pat. No. 3,893,812, Pulak U.S. Pat. No. 4,032,299, Pulak U.S. Pat. No. 4,033,728, and Pulak U.S. Pat. No. 4,065,269. The catalyst recycle schemes taught by these references, however, even when considered in the light of the prior art methods of heat removal, as discussed above, do not and are not able to achieve the simultaneous provision of flue gas cool enough for power recovery, a close control of the temperatures of the various regenerated catalyst streams and the control of heat removal from the regenerator.

The regeneration process and apparatus which I hereby disclose offer the advantages of an easier and quicker start-up, the maintenance of flue gas cool enough for power recovery, the provision of regenerated catalyst hot enough to maintain desired feed stock conversion rates in the reaction zone with reasonable catalyst circulation rates, and facile control of both the regenerated catalyst temperature and the extent of heat removal from the regenerator. My invention involves the combination of a combustion zone, a heat removal zone and paths provided for the internal and/or external recycle of streams of catalysts individually withdrawn from the zones.

SUMMARY OF THE INVENTION

Accordingly, the objectives of my invention are to provide in a process for regenerating a coke-contaminated fluid catalyst (1) methods of control and control systems which enable a close control of the temperature in the upper part of the combustion zone by the control of the recirculation of regenerated catalyst from which heat has been removed to the combustion zone or by circulation catalyst from an upper portion of the combustion zone to a lower position; (2) heat removal from the regenerator and close control thereof by manipulating the extent of immersion of heat removal means in a densephase fluid bed of the regenerator; (3) close control of the temperature of the regenerated catalyst required for circulation to the reactor by obtaining the catalyst from either the heat removal zone of the regenerator, in which it is relatively cool, or the combustion zone of the regenerator in which it is hottest, or as a mixture from both of these sources in relative amounts selected to impart the desired temperature to the mixture; and (4) close control of the temperature of the coke-contaminated fluid catalyst at the point of introduction of the catalyst into the combustion zone.

My invention, in a first embodiment, comprises a process for regenerating a coke-contaminated fluid catalyst to obtain a regenerated catalyst of a pre-determined temperature range with return of the regenerated catalyst to a hydrocarbon conversion zone. The process comprises: (a) introducing oxygen containing regeneration gas and coke-contaminated fluid catalyst into a lower locus of a relatively dilute phase combustion zone maintained at a temperature sufficient for coke oxidation and therein oxidizing coke to produce hot regenerated catalyst and hot flue gas; (b) collecting and withdrawing from an upper locus of its relatively dilute phase combustion zone a portion of the hot regenerated catalyst; (c) transporting the hot flue gas and the remaining portion of the hot regenerated catalyst into a lower locus of a relatively dense phase heat removal zone and therein maintaining its catalyst at relatively dense phase fluid bed conditions; (d) withdrawing heat by a heat removal means from its hot regenerated catalyst in the relatively dense phase heat removal zone; and (e) recovering regenerated catalyst possessing the predetermined temperature range for its return to the hydrocarbon conversion zone by (1) either withdrawing the required regenerated catalyst exclusively from the upper locus of the relatively dilute phase combustion zone when the desired temperature of the regenerated catalyst is the upper limit of the pre-determined range; or (2) withdrawing a portion of the required regenerated catalyst from the relatively dense phase heat removal zone, withdrawing a portion from the upper locus of the relatively dilute phase combustion zone and thereafter admixing the withdrawn portions. The first embodiment includes a method of control comprising sensing the temperature of the admixture of regenerated catalyst and controllably withdrawing the regenerated catalyst from the relatively dense phase heat removal zone responsive to the temperature, thereby admixing the withdrawn portions in suitable proportions for maintaining the temperature within the pre-determined temperature range.

My invention in a second embodiment comprises a process for regenerating a coke-contaminated fluid catalyst to obtain a regenerated catalyst of a pre-determined temperature range for return of the regenerated catalyst to a hydrocarbon conversion zone which process comprises: (a) introducing oxygen containing gas and coke-contaminated fluid catalyst into a lower locus of a relatively dilute phase combustion zone maintain at a temperature sufficient for coke oxidation and therein oxidizing coke to produce the hot regenerated catalyst and hot flue gas; (b) collecting and withdrawing from an upper locus of the relatively dilute phase combustion zone a portion of the hot regenerated catalyst; (c) transporting the hot flue gas and the remaining portions of the hot regenerated catalyst into a lower locus of a relatively dense phase heat removal zone and therein maintaining the catalyst at relatively dense phase fluid bed conditions; and (d) withdrawing heat by a heat removal means from the hot regenerated catalyst maintained in the relatively dense phase heat removal zone. The second embodiment includes a method of controlling the temperature at the upper locus of the relatively dilute phase combustion zone comprising sensing the temperature at the upper locus and controllably withdrawing the regenerated catalyst from the relatively dense phase and introducing the withdrawn portion into the lower locus of the relatively dilute phase combustion zone responsive to the temperature.

My invention in a third embodiment comprises a process for regenerating a coke-contaminated fluid catalyst to obtain a regenerated catalyst of a pre-determined temperature range for return of the regenerated catalyst to a hydrocarbon conversion zone which process comprises: (a) introducing oxygen containing regenerated gas and coke-contaminated fluid catalyst into a lower locus of a dilute phase combustion zone maintained at a temperature sufficient for coke oxidation and therein oxidizing coke to produce hot regenerated catalyst and hot flue gas; (b) collecting and withdrawing from an upper locus of the dilute phase combustion zone a portion of the hot regenerated catalyst. The third embodiment includes a method of controlling the inlet temperature of the dilute phase combustion zone comprising sensing the temperature at the inlet and controllably returning a part of the regenerated catalyst collected and withdrawn from the upper locus of the dilute phase combustion zone to a lower locus of the dilute phase combustion zone responsive to the temperature.

My invention in a fourth embodiment comprises a process for regenerating a coke-contaminated fluid catalyst to obtain a regenerated catalyst of a pre-determined temperature range for return of said regenerated catalyst to a hydrocarbon conversion zone which process comprises: (a) introducing oxygen containing regeneration gas and coke-contaminated fluid catalyst into a lower locus of a dilute phase combustion zone maintained at a temperature sufficient for coke oxidation and therein oxidizing coke to produce hot regenerated catalyst and hot flue gas; (b) collecting and withdrawing from an upper locus of the dilute phase combustion zone a portion of the hot regenerated catalyst. The fourth embodiment includes a method of controlling the temperature of the coke-contaminated fluid catalyst at the locus of the introduction of the catalyst into the lower locus of the dilute phase combustion zone comprising sensing the temperature and controllably mixing a part of the regenerated catalyst collected and withdrawn from the upper locus of the dilute phase combustion zone with the coke-contaminated fluid catalyst at a locus upstream of the locus of introduction.

My invention in a fifth embodiment comprises an apparatus for regenerating a coke-contaminated, fluid catalyst which apparatus comprises in combination: (a) a vertically oriented combustion chamber; (b) a spent catalyst inlet conduit for gas and fluid catalyst connecting with the lower portion of the combustion chamber; (c) fluid catalyst collecting means disposed within an upper portion of the combustion chamber; (d) a first catalyst withdrawal conduit, connecting with the catalyst collecting means, for withdrawal of collected regenerated fluid catalysts from the combustion chamber; (e) a heat removal chamber located super adjacent to the combustion chamber and in communication therewith; (f) heat removal means disposed within the heat removal chamber; (g) a second catalyst withdrawal conduit connected at one end to the heat removal chamber for withdrawing regenerated fluid catalyst from the heat removal chamber; and (h) a mixing conduit connected at one end to the second withdrawal conduit and at the other end to the first withdrawal conduit, such that regenerated fluid catalyst from the heat removal chamber can pass into the first withdrawal conduit. The fifth embodiment includes a control system for the apparatus comprising means to sense the catalyst temperature in the first withdrawal conduit at a locus downstream of the locus where the mixing conduit connects to the first withdrawal conduit, temperature control means having an adjustable set point connecting with the temperature sensing means and developing an output signal, flow control means regulating the rate of flow of regenerated catalyst through the mixing conduit, and means for transmitting the output signal to the flow control means whereby the latter is adjusted responsive to the catalyst temperature.

My invention in a sixth embodiment comprises an apparatus for regenerating a coke-contaminated, fluid catalyst, which apparatus comprises in combination: (a) a vertically oriented combustion chamber; (b) a spent catalyst inlet conduit for gas and fluid catalyst connecting with the lower portion of the combustion chamber; (c) a heat removal chamber located super adjacent to the combustion chamber and in communication therewith; (d) heat removal means disposed within the heat removal chamber; (e) a catalyst withdrawal conduit connected at one end to the heat removal chamber for withdrawing regenerated fluid catalyst from the heat removal chamber; and (f) a catalyst recycle conduit connecting the withdrawal conduit with the lower portion of the combustion chamber, such that regenerated fluid catalyst can pass from the heat removal chamber to the combustion chamber. The sixth embodiment includes a control system for the apparatus comprising means to sense the catalyst temperature an upper locus of the combustion chamber, temperature control means having an adjustable set point connecting with the temperature sensing means and developing an output signal, flow control means regulating the rate of flow of regenerated catalyst through the catalyst withdrawal conduit, and means for transmitting the output signal to the flow control means whereby the latter is adjusted responsive to the catalyst temperature.

My invention in a seventh embodiment comprises an apparatus for regenerating a coke-contaminated, fluid catalyst which apparatus comprises in combination: (a) a vertically oriented combustion chamber; (b) a spent catalyst inlet conduit for gas and fluid catalyst connecting with the lower portion of the combustion chamber; (c) fluid catalyst collecting means disposed within an upper portion of the combustion chamber; and (d) a catalyst recycle conduit connecting with the catalyst collecting means at one end and discharging into the lower portion of the combustion chamber at the other end, such that fluid catalyst can pass from said upper portion of the combustion chamber to the lower portion of the combustion chamber. The seventh embodiment includes a control system for the apparatus comprising means to sense the catalyst temperature at the lower portion of the combustion chamber, temperature control means having an adjustable set point connecting with the temperature sensing means and developing an output signal, flow control means regulating the rate of flow of regenerated catalyst through the catalyst recycle conduit, and means for transmitting the output signal to the flow control means whereby the latter is adjusted responsive to the catalyst temperature.

My invention in an eighth embodiment comprises an apparatus for regenerating a coke-contaminated, fluid catalyst which apparatus comprises in combination: (a) a vertically oriented combustion chamber; (b) a spent catalyst inlet conduit for gas and fluid catalyst connecting with the lower portion of the combustion chamber; (c) fluid catalyst collecting means disposed within an upper portion of the combustion chamber; (d) a catalyst withdrawal conduit connecting with the catalyst collecting means, for withdrawal of collected regenerated fluid catalyst from the combustion chamber; and (e) a mixing conduit connected at one end with the catalyst withdrawal conduit and at the other end with the spent catalyst inlet conduit. The eighth embodiment includes a control system for the apparatus comprising means to sense the catalyst temperature at a lower portion of the combustion chamber, temperature control means having an adjustable set point connecting with the temperature sensing means and developing an output signal, flow control means regulating the rate of flow of regenerated catalyst through the mixing conduit, and means for transmitting the output signal to the flow control means whereby the latter is adjusted responsive to the catalyst temperature.

Other embodiments and objects of the present invention encompass further details such as process streams, the function and arrangement of various components of my apparatus, and control methods and systems relating to the extent of immersion of the heat removal means in the dense phase fluid bed, all of which are hereinafter disclosed in the following discussion of each of these facets of the invention.

BRIEF DESCRIPTION OF THE DRAWINGS

Referring now to FIG. 1, a regenerator is shown which includes vertically-oriented combustion zone 1 in association with heat removal zone 2. Coke-contaminated catalyst enters the regenerator through conduit 4, after having passed through flow control valve 5. Regeneration gas enters the system in conduit 3 and combines with coke-contaminated catalyst in conduit 4 and regenerated catalyst in conduit 20 before passing to distributor 6 located in the lower part of combustion zone 1. The combination of conduits 20, 3 and 4 and distributor 6 are referred to herein as "inlet for gas and catalyst".

Figure 1:
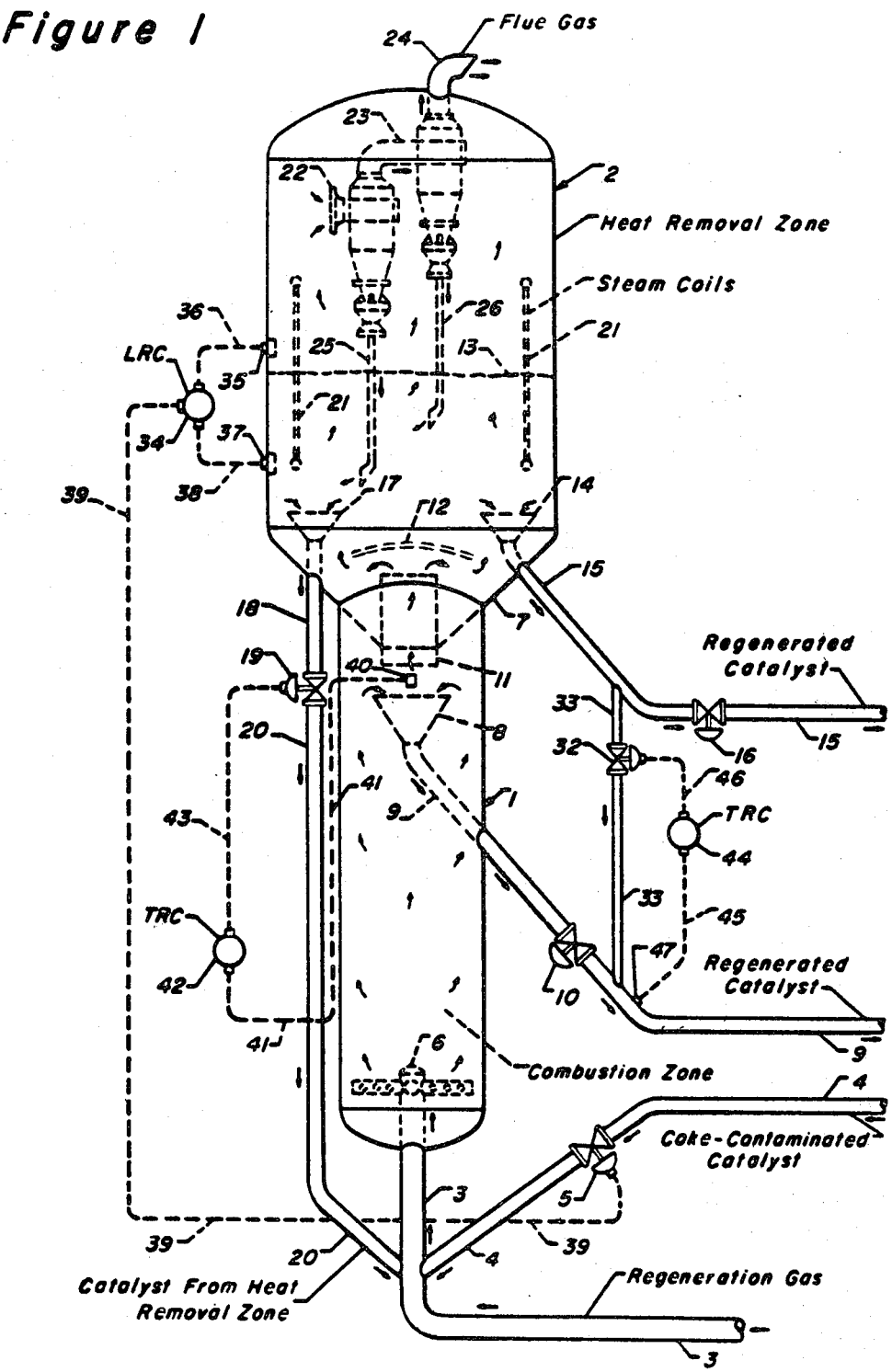
FIG. 1 is a sectional, elevation view of a regeneration apparatus according to the present invention, showing combustion zone 1 and heat removal zone 2, recycle conduit 18, 20 and mixing conduit 33.

A mixture of regeneration gas, regenerated catalyst and coke-contaminated catalyst exit distributor 6 and pass upwardly within combustion zone 1. Conditions within the combustion zone are such that the regeneration gas and coke combine chemically to form flue gas, leaving the catalyst relatively free from coke.

Fluid catalyst collecting means 8 is situated in an upper part of combustion zone 1 and in the proximity of surface 7 and passageway 11. A portion of regenerated catalyst within the combustion zone is collected by fluid catalyst collecting means 8 and exits the combustion zone through withdrawal conduit 9 and control valve 10. Any catalyst collected in means 8, in excess of that withdrawn through conduit 9, will overflow back into the combustion zone and be re-entrained by the combustion gas. The remaining portion of regenerated catalyst within combustion zone with flue gas through passageway 11 and impinges upon deflector 12, which serves to distribute the flue gas to the dense-phase fluidized bed in the heat removal zone.

Heat removal zone 2 is located above combustion zone 1 and communicates therewith through passageway 11. Situated within heat removal zone 2 are: heat removal means 21; means 14, 15 for withdrawing fluid catalyst; collecting means 17 and recycle conduit 18, 20; dense-phase fluid catalyst bed 13; and gas-catalyst separation means 23. Pressure sensitive devices 35 and 37 connect with level sensing, recording and control device 34 by way of lines 36 and 38, respectively. Level sensing and control device 34 connects to flow control valve 5 by way of line 39. Temperature recorder control device 42 connects to temperature sensing device 40 by way of line 41, and connects to control valve 19 by way of line 43. Temperature recorder control device 44 connects to temperature sensing device 47 by way of line 45, and connects to control valve 32 by way of line 46.

Flue gas and regenerated catalyst, having entered heat removal zone 2 through passageway 11, intermingle with particulated catalyst in dense-phase fluid bed 13. Means 14, 15 withdrawing fluid catalyst have associated with them flow control valve 16 for the control of the rate of catalyst withdrawal. The surface level of fluid bed 13 may be raised or lowered indirectly by reducing or increasing the flow, respectively, through flow control valve 5. Level sensing, recording and control device 34 determines the level of the dense-phase catalyst bed 13 based on the differentials in pressures measured by pressure sensitive devices 35 and 37. Variations in bed density and/or depth of bed within the dense-phase region will be reflected in a varying pressure differential. Device 34 will then maintain a predetermined level in dense-phase bed 13 by controlling control valve 5. Raising or lowering the level of fluid bed 13 increases or decreases, respectively, the extent of immersion of heat removal means 21 in bed 13. Flue gas exits bed 13, entraining therewith a small amount of regenerated catalyst, and enters inlet 22 of separation means 23 where the entrained catalyst is disengaged from the flue gas. Flue gas, now separated from the priorly entrained catalyst, exits heat removal zone 2 through outlet 24. Priorly-entrained catalyst returns to fluid bed 13 from separation means 23 in conduits 25 and 26.

Recycle conduit 18, fitted with control valve 19, is provided in order that a flow of catalyst from dense-phase fluid bed 13 to regeneration gas inlet 3 may be established and regulated. Temperature recorder control device 42 determines the temperature of the catalyst in conduit 9 and controls control valve 19 in response thereto so as to achieve a pre-determined temperature setting.

Mixing conduit 33 is provided for communication between conduit 15 and conduit 9, such that catalyst withdrawn from heat removal zone 2 in conduit 15 may pass, through control valve 32, into conduit 9 downstream of control valve 10. Temperature recorder control device 44 determines the temperature of the catalyst in conduit 9 and controls control valve 32 in response thereto so as to achieve a predetermined temperature setting.

Figure 2:
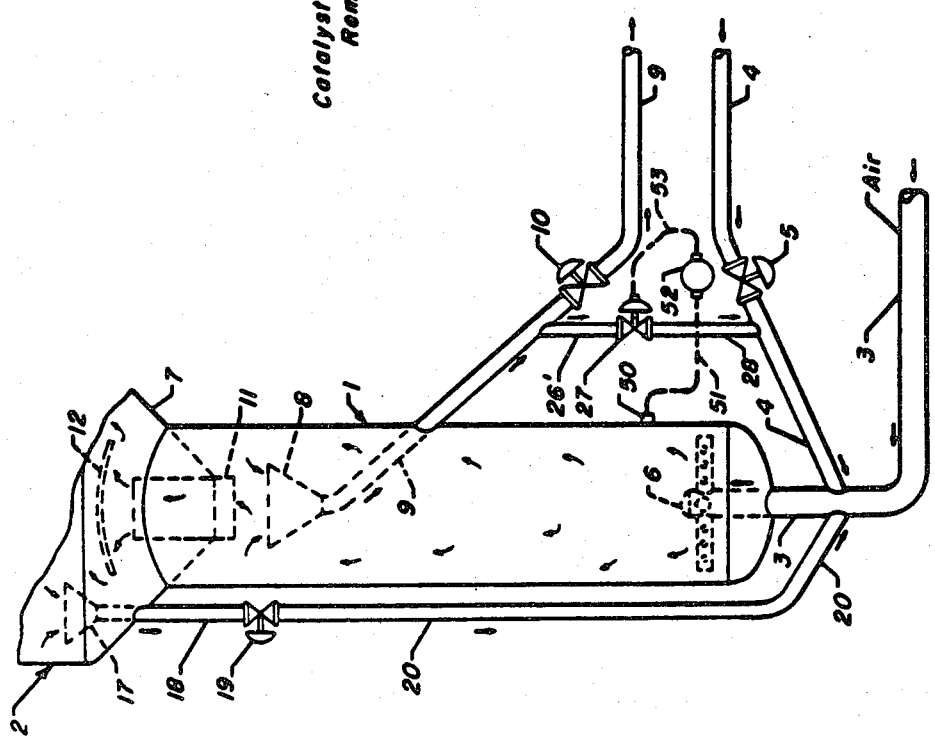
FIG. 2 is an enlarged sectional view of combustion zone 1, fluid catalyst collecting means 8 and second mixing conduit 26'.

Turning now to FIG. 2, second mixing conduit 26', 28 and control valve 27 are shown. This second mixing conduit is provided to accommodate a flow of regenerated catalyst from withdrawal conduit 9 to coke-contaminated catalyst conduit 4. Temperature recorder control device 52 connects to temperature sensing device 50 by way of line 51, and connects to control valve 27 by way of line 53.

Figure 3:
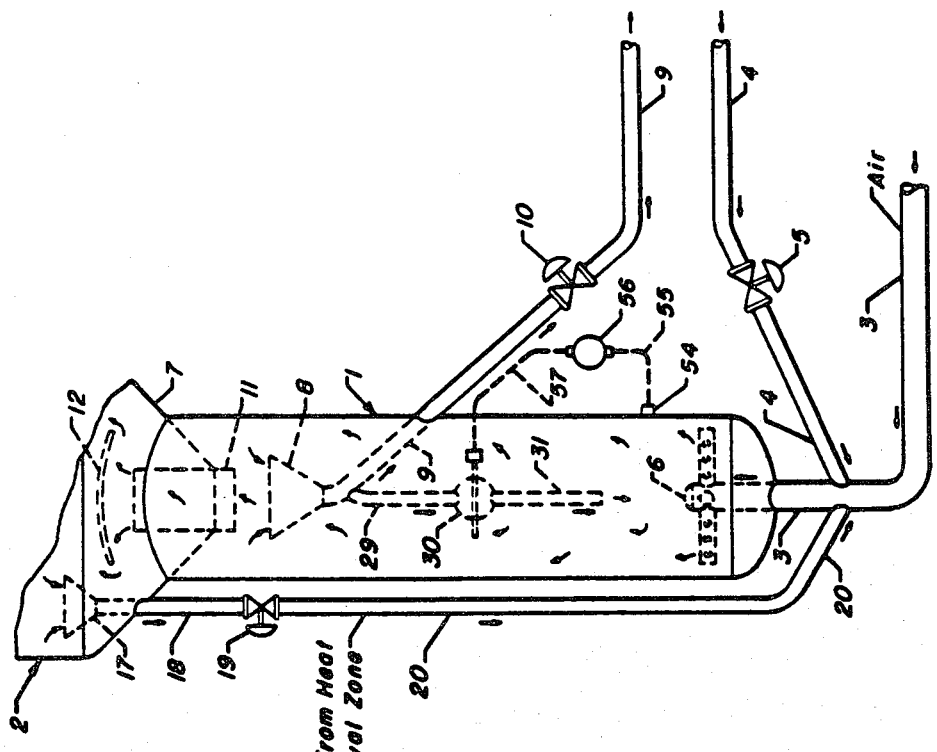
FIG. 3 is another enlarged, sectional view of combustion zone 1, showing second recycle conduit 29, 31.

Proceeding to FIG. 3, the alternative recycle conduit 29, 31, having a fixed flow regulating means 30, is indicated. The alternative recycle conduit is provided to furnish a flow path for regenerated catalyst from fluid catalyst collecting means 8, internally with combustion zone 1, to a lower part of the combustion zone. Temperature recorder control device 56 connects to temperature sensing device 54 by way of line 55, and connects to flow regulating means 30 by way of line 57.

The above-described drawings are intended to be schematically illustrative of my invention and not be limitations thereon.

DETAILED DESCRIPTION OF THE INVENTION

The present invention, in its process aspects, consists of steps for the regenerative combustion within a combustion zone of the coke-contaminated catalyst from a reaction zone to form hot flue gas and hot regenerated catalyst, collection and withdrawal of a portion of the hot regenerated catalyst, cooling of another portion of the hot regenerated catalyst within a heat removal zone, cooling of hot flue gas within the heat removal zone, using the cooled regenerated catalyst as a heat sink, and the use of portions of hot regenerated catalyst and cooled regenerated catalyst for control of the temperatures of the combustion zone and the regenerated catalyst stream to be returned to the reaction zone.

Reference will now be made to the attached drawings for a discussion of the regeneration process and apparatus of my invention. In FIG. 1 regeneration gas, which may be air or another oxygen-containing gas, enters in conduit 3 and mixes with coke-contaminated catalyst entering in conduit 4 and regenerated catalyst in conduit 20. The resultant mixture of coke-contaminated catalyst, regenerated catalyst and regeneration gas are distributed into the interior of combustion zone 1, at a lower locus thereof, by distributor 6. Coke-contaminated catalyst commonly contains 0.1 to 5 wt. % carbon, as coke. Coke is predominantly comprised of carbon, however, it can contain from 5 to 15 wt. % hydrogen, as well as sulfur and other materials. The regeneration gas and entrained catalyst flows upward from the lower part of combustion zone 1 to the upper part thereof. While it is not critical to the practice of this invention, it is believed that dilute phase conditions, that is a catalyst/gas mixture of less than 30 lbs. per cubic foot, and typically 2–10 lbs. per cubic foot, are the most efficient for coke oxidation. As the catalyst/gas mixture ascends within combustion zone 1 the heat of combustion of coke is liberated and absorbed by the now relatively carbon-free catalyst, in other words by the regenerated catalyst.

The rising catalyst/gas stream impinges upon surface 7, which impingement changes the direction of flow of the stream. It is well known in the art that impingement of a fluidized particulate stream upon a surface, causing the stream to turn through some angle, can result in the separation from the stream of a portion of the solid material therein. The impingement of the catalyst-gas stream upon surface 7 within combustion zone 1 causes a portion of the hot regenerated catalyst flowing in the combustion zone to collect within fluid catalyst collecting means 8. Means 8 may be a cone-shaped receptacle, as shown, or any other shape appropriate for collecting catalyst particles. The gaseous products of coke oxidation and excess regeneration gas, or flue gas, and the uncollected portion of hot regenerated catalyst flow through passageway 11 and enter fluidized bed 13 within super adjacent heat removal zone 2. The density of the catalyst-gas mixture within bed 13 is preferably maintained at 30 lbs. per cubic foot or higher and it is therefore characterized as a dense-phase fluid bed.

I prefer the maintenance of a dense-phase fluid bed within the heat removal zone, rather than a dilute-phase fluid bed, because dense-phase conditions afford greatly increased heat transfer rates from the bed to heat removal means 21. Heat removal means 21 are provided to withdraw heat from the dense-phase bed. In a preferred embodiment of my invention the heat removal means comprise conduits of substantially vertical orientation, the interiors of which conduits are sealed from the interior of the heat removal zone, and which conduits have flowing therein a heat-absorbing material, such as water. The objective is to absorb heat into the heat-absorbing material through its indirect contact with dense-phase fluid bed 13. As the heat transfer coefficient is much higher for the section of the tubes immersed in the fluidized bed, than for the section of tubes above the bed, changing the extent of immersion will change the amount of heat removed. The immersion of heat removal means 21 may be varied by any suitable means, including the vertical displacement of the heat removal means with respect to the dense-phase bed or the variation in regenerated catalyst inventory within the heat removal zone. In this embodiment the surface of fluid bed 13, and therefore the extent of immersion of heat removal means 21, is controlled through the action of control valve 5, and the resulting fluctuations of the catalyst level in the reactor or reactor catalyst stripper are permitted. However, when widely different feedstocks are processed, producing widely different amounts of coke, and as a result requiring widely different heat removal from the regenerator, it is foreseen that additional catalyst would be added to the unit in order to allow a substantial increase in the level of bed 13, without losing the catalyst level entirely in the associated reactor or reactor catalyst stripper. It should also be understood that it will not be necessary to make changes in the catalyst inventory of the heat removal zone to accommodate relatively small changes in the coke level on spent catalyst, as would be encountered when changing between two relatively similar reduced crude feeds, or as might be caused by some change in operating conditions within the reactor section, or slight change in feed change rate to the reactor section. If small changes in coke on spent catalyst or heat removal requirement occur, it is anticipated that the operating temperature in the heat removal zone would be allowed to vary over a range of say 50° F. before any adjustments of level is required, and this change in temperature would automatically adjust the amount of heat removed. Although the temperature in the heat removal zone may vary over a range of say 50° F., the temperature at the top of the combustor, and of the catalyst withdrawn through collection means 8 will remain unchanged and steady at the selected control temperature. This provides a degree of freedom not previously available to the FCC operator.

Control of the extent of immersion of the heat removal means in the dense-phase fluid bed of the heat removal zone is effected by level control means 34, which has a set point that may be manually adjusted, thereby manipulating the extent of immersion of the heat removal means in the dense-phase responsive to the temperature thereof. The level control means controls the extent of immersion of the heat removal means by sensing the extent of immersion with level sensing means 35 and 37 which connect to level control means 34 via lines 36 and 38, generating a level output signal from level control means 34, and transmitting the latter via line 39 to contaminated catalyst flow control means 39 whereby the latter is adjusted responsive to the extent of immersion.

Hot regenerated catalyst within the heat removal zone contacts, and is cooled by, heat removal means 21. The cooled regenerated catalyst thereafter contacts hot flue gas which is ascending through the fluid bed within the heat removal zone. This contact results in heat exchange between the hot flue gas and the cooler regenerated catalyst, providing a relatively cooler flue gas. The relatively cooler flue gas exits fluid bed 13 and enters separation means 23 through inlet 22. These separation means may be cyclone separators, as schematically shown in FIG. 1, or any other effective means for the separation of particulated catalyst from a gas stream. Catalyst separated from the relatively cooler flue gas returns to dense-phase fluid bed 13 through conduits 25 and 26. The relatively cooler flue gas exits heat removal zone 2 via conduit 24, through which it may safely proceed to associated energy recovery systems.

Recycle conduit 18 is attached at one end to a lower part of the heat removal zone and at the other end to a lower part of the combustion zone. Cooler regenerated catalyst proceeds through this conduit, the flow rate being controlled by control valve 19, from heat removal zone 2 to combustion zone 1 and provides a heat sink for the reduction and thereby a control of the combustion zone temperature. The flow rate of the cooler regenerated catalyst stream will be controlled in order to maintain a constant temperature of the catalyst withdrawn from conduit 9, or alternatively, the temperature of the mixture of flue gas and catalyst passing through passageway 11. These temperatures will commonly be in the range of 1300°–1400° F.

Control of the temperature of the regenerated catalyst at the upper locus of the combustion zone is effected by sensing that temperature with sensing means 40, connecting the latter via line 41 to temperature control means 42 which has an adjustable set point and which develops an output signal, transmitting the latter via line 43 to flow control means 19, and adjusting the latter responsive to the upper locus temperature, thereby controllably withdrawing the catalyst from the heat removal and passing it to a lower locus of the combustion zone.

Means 14 may be provided within heat removal zone 2 for the withdrawal of cooler regenerated catalyst therefrom.

As aforesaid, the hot regenerated catalyst in conduit 9 is returned to the reaction zone at a rate sufficient to sustain the required temperature within the reaction zone. It is highly desirable, therefore, that the hot regenerated catalyst temperature be controllable at an optimum level. Operating in accordance with this invention it is possible to select catalyst at the temperature of the combustion zone, through collection means 8, or of the heat removal zone through collection means 14. If neither of these temperatures are optimum for the reactor section, then a controlled temperature intermediate between these two can be achieved by utilizing conduit 33 and associated control valve 32. Conduit 33 which is connected at one end to the means for withdrawing cooler regenerated catalyst from heat removal zone 2 and at the other end to the conduit for withdrawal of hot regenerated catalyst 9, is a mixing conduit as it provides a path for the introduction of cooler regenerated catalyst into the hot regenerated catalyst stream for the purpose of lowering the temperature of the hot regenerated catalyst stream when necessary to maintain the temperature of the stream of regenerated catalyst returning to the reaction zone. This will permit blending of catalyst from the regeneration and heat removal zones, in order to obtain a catalyst stream for return to the reactor at a temperature intermediate between the temperature of regeneration and heat removal zones. This mode of operation is suggested as an alternative to the other options of withdrawing 100% of the catalyst from either of the two zones, or of having separate inlets to the reactor riser for the regenerated catalyst from each zone.

Control of the desired temperature of the catalyst blend is effected by sensing the temperature of the catalyst blend with temperature sensing means 47, connecting the latter via line 45 to temperature control means 44 which has an adjustable set point and which develops an output signal, transmitting the latter via line 46 to flow control means 32, and adjusting the latter responsive to the blend temperature, thereby controllably withdrawing the catalyst from the heat removal zone for blending with catalyst from the regeneration zone responsive to the blend temperature.

Reiterating, it is often desirable that the temperature within the combustion zone be amenable to control at a preselected, constant level. Conduit 18 has been provided for the introduction to combustion zone 1 of cooler regenerated catalyst in order to suppress and control the temperature within the combustion zone.

It may also be desirable to provide an affirmative method for minimizing the temperature rise across the combustion zone. This will result in a lower temperature rise across the regeneration zone, and the higher average combustion temperature could be used in order to obtain greater regeneration efficiency. FIG. 2 indicates the provision of second mixing conduit 26', 28 and associated flow control valve 27. This second mixing conduit provides for the recycle of hot regenerated catalyst, a part of that collected in the upper locus of the combustion zone by collecting means 8, to a lower locus of the combustion zone. Such recycle of hot regenerated catalyst to the relatively cooler, lower region of the combustion zone provides a heat input which raises the temperature of the lower region of the combustion zone.

Control of the lower combustion zone temperature may be effected by sensing that temperature with sensing means 50, connecting the latter via line 53 to temperature control means 52 which has an adjustable set point and which develops an output signal, transmitting the latter via line 53 to flow control means 27, and adjusting the latter responsive to the lower locus temperature, thereby controllably recycling hot regenerated catalyst collected in the upper locus by collecting means 8 to the lower locus of the combustion zone via conduits 9, 26', 28, 4 and 3, and via flow control means 27.

Another manner of effecting a minimum temperature rise across the combustion zone and an increased lower combustion zone temperature is shown in FIG. 3. Hot regenerated catalyst which has been collected by means 8 at a relatively hotter, upper locus of the combustion zone may be returned directly to a relatively cooler lower locus of the combustion zone to raise the temperature therein. FIG. 3 indicates a second recycle conduit, designated as item 29, 31. The second recycle conduit is connected at one end to fluid catalyst collecting means 8, and the other end is in open communication with a lower locus of the combustion zone. Also shown in FIG. 3 is flow restricting means 30 situated in the second recycle conduit. Such a flow restricting device is desirable for the purpose of controlling the extent of increase of combustion zone temperature by control of the rate of internal recycle of hot regenerated catalyst through the second recycle conduit. Item 30 may be a flow control valve, a restriction orifice, or any other appropriate flow-varying means.

Control of the lower combustion zone temperature is effected by sensing that temperature with sensing means 54, connecting the latter via line 55 to temperature control means 56 which has an adjustable set point and which develops an output signal, transmitting the latter via line 57 to flow control means 30, and adjusting the latter responsive to the lower locus temperature, thereby controllably withdrawing the catalyst from collecting means 8 and passing it to the lower locus of the combustion zone.

ILLUSTRATIVE EMBODIMENT

The following example represents a particularly preferred mode contemplated for the practice of my invention, expressed in items of the mass flow rates and temperatures of streams flowing in the regenerator depicted in attached FIG. 1. The regenerator processes spent catalyst from a reaction zone which is cracking a reduced crude oil feed stock. In the tabulation below the streams flowing within conduit are tabulated in registry with the item numbers of the conduits shown in FIG. 1.

| Stream | | lbs./hr. | °F. |
| --- | --- | --- | --- |
| 4 | Coke Contaminated Catalyst (from reactor) | 2,724,552 | 1050 |
| | Catalyst | 2,691,362 | 1050 |
| | Coke | 30,902 | 1050 |
| 3 | Regeneration Gas (air) | 463,530 | 307 |
| 9 | Hot Regenerated Catalyst From Upper Locus of Combustion Zone (to reactor) | 2,691,362 | 1380 |
| 11 | Hot Regenerated Catalyst plus Hot Flue Gas | 4,114,730 | 1400 |
| | Hot Catalyst | 3,621,428 | 1400 |
| | Hot Gas | 493,302 | 1400 |
| 18, 20 | Recycled Cooler Regenerated Catalyst (to inlet of combustion zone) | 3,621,428 | 1230 |
| 24 | Flue Gas | 493,302 | 1250 |
| 21 | Heat Removed by Heat Removal Means — $169.17 \times 10^6$ BTU/hr. Heat Losses From Regenrator Vessel — $3.41 \times 10^6$ BTU/hr. | | |

It should be noted that in this particular operation the feed stock to the reaction zone is a reduced crude oil, a material which yields a relatively high coke production. Such a high coke production, and the consequent, extraordinary high evolution of heat in the combustion zone made necessary the recycle of U.S. Pat. No. 3,621,428 lbs./hr. of cooler regenerated catalyst from the heat removal zone to the combustion zone in order to limit the maximum combustion zone temperature to 1400° F.

It should also be noted that this illustrative embodiment is presented for a system where all of the catalyst returned to the riser is withdrawn from collection means 8 at 1380° F. If required, the catalyst could be withdrawn from the heat removal zone at 1230° F. This would result in a substantial increase in the catalyst circulation rate to the reactor section in order to maintain the 1050° F. reaction zone shown. Furthermore, both the temperature at the top of the combustion zone and in the heat removal zone could be adjusted over a range of 100°–150° F. from the temperatures shown, by appropriate changes in heat removal surface in the heat removal zone and circulation rates of the various streams shown.

No flow in conduits 26 or 29 has been shown in the illustrative embodiment as these serve only to reduce the temperature rise across the combustion zone and do not influence the overall heat balance of the regeneration system.

As shown in the data tabulation the hot regenerated catalyst is withdrawn from the combustion zone at 1380° F., while the flue gas exits the heat removal zone at 1250° F., relatively cooler than the hot regenerated catalyst and well below the precautionary 1300° F. limit set by downstream energy recovery systems.

I claim as my invention:

1. An apparatus for regenerating a coke-contaminated, fluid catalyst, which apparatus comprises:
   (a) a vertically oriented combustion chamber having two sections, a lowermost and uppermost section, wherein said lowermost section is a relatively dense-phase lowermost combustion section containing fluidized catalyst in a relatively dense-phase and said uppermost section is a relatively dilute phase uppermost combustion section containing fluidized catalyst in a relatively dilute phase having a catalyst to gas mixtures of from about 2 to about 10 lbs. per cubic foot;
   (b) a spent catalyst inlet conduit for gas and fluid catalyst connecting with said lowermost section of said combustion chamber containing said relatively dense-phase;
   (c) a heat removal chamber located superadjacent with respect to said combustion chamber and in direct communication with said relatively dilute phase uppermost combustion section;
   (d) a heat removal means disposed within said heat removal chamber;
   (e) a catalyst withdrawal conduit connected at one end to said heat removal chamber for withdrawing regenerated fluidized catalyst from said heat removal chamber;
   (f) a catalyst recycle conduit connecting said heat removal chamber with said spent catalyst inlet conduit, said inlet conduit providing communication of said heat removal chamber with said relatively dense-phase lowermost combustion section of said combustion chamber, whereby regenerated fluidized catalyst is passed from said heat removal chamber, through said recycle catalyst conduit and spent catalyst inlet conduit to said relatively dense-phase lowermost combustion section; and,
   (g) a control system which comprises:
      (i) means to sense the temperature in said dilute-phase of fluidized catalyst at a locus within said relatively dilute phase uppermost combustion section;
      (ii) temperature control means having an adjustable set point connecting with said temperature sensing means and developing an output signal;
      (iii) flow control means regulating the rate of flow of said regenerated catalyst through said catalyst recycle conduit; and
      (iv) means for transmitting said output signal to said flow control means in said catalyst recycle conduit, whereby the latter is adjusted responsive to said dilute-phase catalyst temperature sensed in said relatively dilute phase uppermost combustion section.

2. Apparatus of claim 1 wherein a means for manipulating the extent of immersion of said heat removal means is positioned in a fluid catalyst bed disposed within said heat removal chamber and includes a second control system for said apparatus comprising means to sense the level of said fluidized catalyst bed, level control means having an adjustable set point and developing a level output signal, second flow control means regulating the rate of flow of said spent catalyst into said combustion chamber, and means for transmitting said level output signal to said second flow control means whereby the latter is adjusted responsive to said level.

* * * * *